US011615369B2

(12) United States Patent
Leonard et al.

(10) Patent No.: US 11,615,369 B2
(45) Date of Patent: Mar. 28, 2023

(54) REAL-TIME, INDEPENDENTLY VERIFIABLE LOCATION TRACKING SYSTEM

(71) Applicant: Trimble Transportation Enterprise Solutions, Inc., Mayfield Heights, OH (US)

(72) Inventors: Timothy Leonard, Moreland Hills, OH (US); Vasanth Srinivasan, Oklahoma City, OK (US); Joseph M. DeBoth, Chagrin Falls, OH (US); Mark Botticelli, Minnetonka, MN (US)

(73) Assignee: Trimble Transportation Enterprise Solutions, Inc., Mayfield Heights, OH (US)

( * ) Notice: Subject to any disclaimer, the term of this patent is extended or adjusted under 35 U.S.C. 154(b) by 214 days.

(21) Appl. No.: 16/134,216

(22) Filed: Sep. 18, 2018

(65) Prior Publication Data

US 2019/0258992 A1 Aug. 22, 2019

Related U.S. Application Data

(60) Provisional application No. 62/634,087, filed on Feb. 22, 2018.

(51) Int. Cl.
*G06Q 10/08* (2012.01)
*G06Q 10/06* (2012.01)
(Continued)

(52) U.S. Cl.
CPC . *G06Q 10/08355* (2013.01); *G06Q 10/06312* (2013.01); *G06Q 10/0833* (2013.01);
(Continued)

(58) Field of Classification Search
CPC ....... G06Q 10/08355; G06Q 10/06312; G06Q 10/0833; H04L 9/0637; H04L 9/3236; H04L 2209/38; H04L 9/50
See application file for complete search history.

(56) References Cited

U.S. PATENT DOCUMENTS 7,743,984 B2 * 6/2010 Olsen ................. G06K 19/0723
340/8.1
2014/0310041 A1 10/2014 Crocker et al.
(Continued)

FOREIGN PATENT DOCUMENTS

JP 4941273 B2 * 5/2012 ........... G07B 15/063

OTHER PUBLICATIONS

Morgan, M., Trucking Loss, Damage, or Delay Claims—#3, CTL-AST&L & Registered Transportation Practitioner, 2015, 2 pages.
(Continued)

*Primary Examiner* — Paul Danneman
(74) *Attorney, Agent, or Firm* — Kilpatrick Townsend & Stockton LLP

(57) ABSTRACT

A computer system collects and processes data related to a series of shipments from a number of sources (e.g., in the form of a set of event streams formed by grouping and/or processing information from respective sources into information to be processed by the computer system). Some of the information received in the event streams is sufficient to enable the computer system to track shipments and to store on a blockchain network and/or read from a blockchain network information related to the event streams and/or the information generated within the computer system. In such a configuration, third-parties may be able to utilize the blockchain information to determine information about relevant shipments (e.g., tracking information, point of delivery information and even delivery exception information).

20 Claims, 7 Drawing Sheets

(51) Int. Cl.
  *H04L 9/06* (2006.01)
  *H04L 9/32* (2006.01)
  *G06Q 10/0835* (2023.01)
  *G06Q 10/0631* (2023.01)
  *G06Q 10/0833* (2023.01)
  *H04L 9/00* (2022.01)

(52) U.S. Cl.
  CPC .......... *H04L 9/0637* (2013.01); *H04L 9/3236* (2013.01); *H04L 9/50* (2022.05)

(56) References Cited

U.S. PATENT DOCUMENTS

| | | |
|---|---|---|
| 2015/0073853 A1 | 3/2015 | Hariharan et al. |
| 2015/0154578 A1* | 6/2015 | Aggarwal ............ G07B 15/063 |
| | | 705/13 |
| 2016/0019497 A1* | 1/2016 | Carvajal ................ H04L 67/104 |
| | | 705/333 |
| 2018/0046964 A1 | 2/2018 | Leoni et al. |
| 2018/0136003 A1 | 5/2018 | Perkins et al. |
| 2018/0189528 A1* | 7/2018 | Hanis ................. G06Q 30/0185 |
| 2018/0341910 A1 | 11/2018 | Broveleit |
| 2021/0043012 A1* | 2/2021 | Einecke ................. H04W 4/40 |

OTHER PUBLICATIONS

U.S. Appl. No. 16/134,194 Non-Final Office Action dated Jun. 22, 2020, 29 pages.

* cited by examiner

REAL-TIME, INDEPENDENTLY VERIFIABLE LOCATION TRACKING SYSTEM

CROSS-REFERENCE TO CO-PENDING APPLICATION

The present application claims priority to and incorporates by reference the disclosure of: U.S. Provisional Patent Application No. 62/634,087, filed on Feb. 22, 2018.

FIELD OF INVENTION

The present invention is directed to a real-time, independently verifiable location tracking system and method, and, in one embodiment, to a blockchain-based system and method for processing location information to provide and store on a blockchain third-party verification of the location of a vehicle and/or goods on a vehicle.

DISCUSSION OF THE BACKGROUND

Despite being called "shippers," shippers transport goods using a number of different kinds of "shipping mechanisms," including, but not limited to automotive vehicles (e.g., trucks, cars, and vans), trains, and ships. Often shippers contract with one or more carriers to handle the delivery of the goods from the contract origin to the contract destination. Those "carriers" themselves may either transport the goods between the contract origin and the contract destination or the "carriers" may act more as carrier/brokers (or consolidators) that subcontract part of the transportation to others, or just brokers (or consolidators) that subcontract all of the transportation to others.

Known shipping arrangements include clauses that trigger payments by the shipper to the carrier based on delivery of the goods to the contract destination. Payments to the carrier in turn may trigger payments to subcontractors and/or to drivers. However, such payment triggers provide a financial incentive to those handling the end delivery (e.g., the drivers) to indicate delivery of goods as early as possible—potentially before the goods have even been delivered.

Similarly, some goods being transported may be considered so "mission critical" or time sensitive (e.g., needed by a particular time and date as part of a just-in-time production facility) that the recipient of the goods may not be able to rely on (1) outdated delivery information from the shipper or (2) delivery information that is too coarse-grained to enable real-time or just-in-time delivery decisions. Accordingly, there is a need for a real-time, independently verifiable location tracking information and for a system and method for generating and processing the same.

However, another common issue dealt with in the shipping industry is detention, i.e., the mis-scheduling of a delivery vehicle that causes a delay in the utilization of the delivery vehicle (or the loading/unloading facility). For example, a driver may have arrived at a location for pickup or delivery but is unable to immediately pick up or deliver due to: (1) a lack of loading area (e.g., loading dock or loading port) availability (e.g., a previous delivery has not finished picking up or loading, or a staging area has not been cleared of a previous delivery so there is no staging room to which the current load can be unloaded), (2) a lack of loading area support staff (e.g., the loading area is available but the staff to load or unload are currently at lunch or on break and will not return for a known period of time), (3) a lack of loading area assets (e.g., a forklift or crane needed to handle the loading or unloading is unavailable because it is being used by another loading area), and (4) an improperly staged delivery (e.g., not all of the load that is to be loaded onto the truck has been moved from an internal area (e.g., shelving or container stacked area) of the transportation depot (e.g., trucking, shipping or train warehouse or port) to the loading area). Each of those situations can result in "detention" of the delivery vehicle such that the carrier/driver is entitled to compensation for the resulting delay that often cascades into the carrier/driver missing a future delivery opportunity as a result. Accordingly, there is a need for a real-time detention avoidance system and method for generating and processing detention information (e.g., for triggering smart contract penalty clauses).

BRIEF DESCRIPTION OF THE DRAWINGS

The following description, given with respect to the attached drawings, may be better understood with reference to the non-limiting examples of the drawings, wherein.

DISCUSSION OF THE PREFERRED EMBODIMENTS

Figure 1:
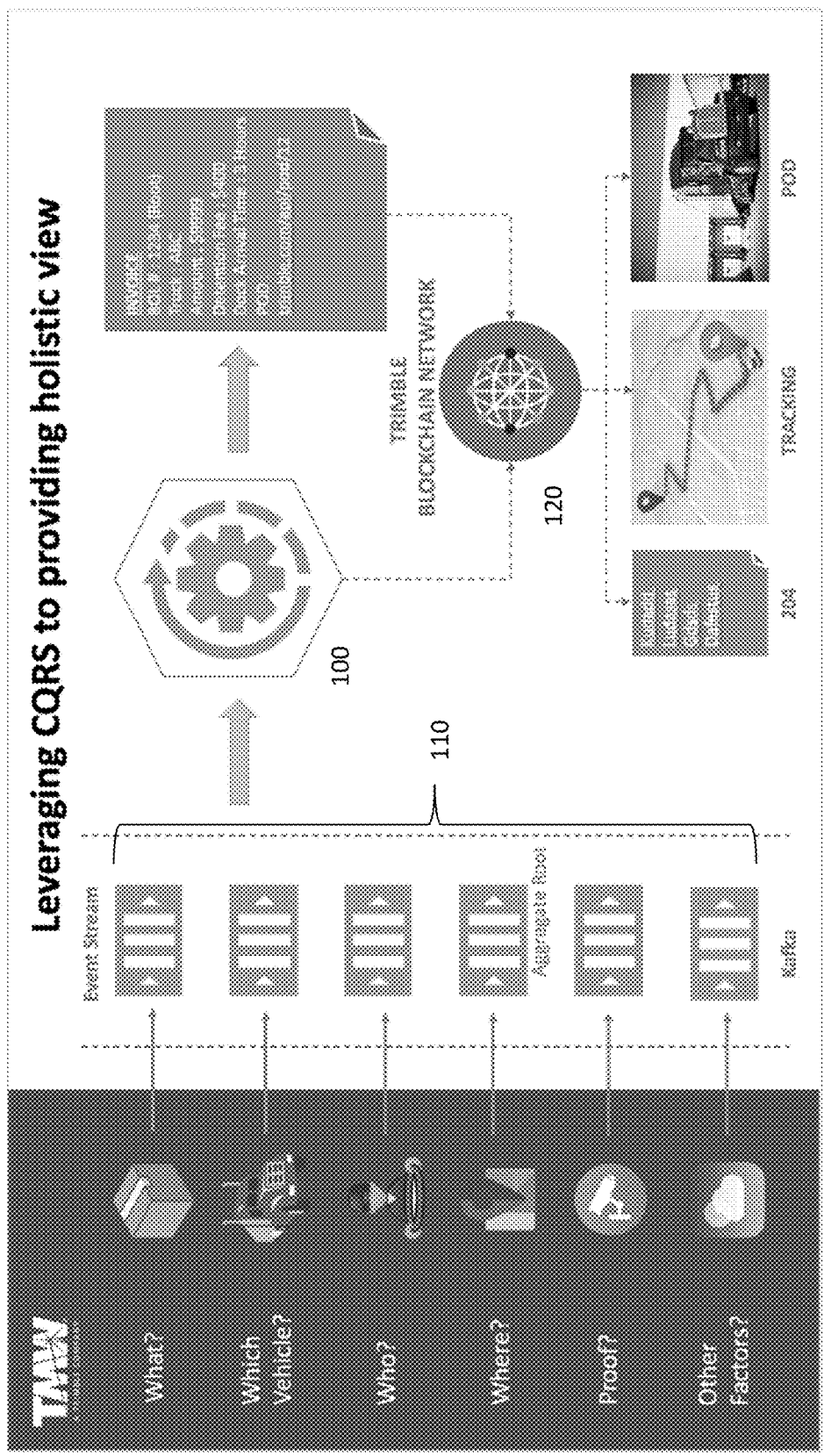
FIG. 1 is a data transfer diagram showing how data related to a series of shipments is collected from a number of sources into a number of event streams, consolidated, used to generate reports/invoices relating to the shipments, and placed into a blockchain network for access by a number of participants in the shipping process.

Turning to FIG. 1, a data transfer diagram illustrates collecting and processing data related to a series of shipments from a number of sources. At least one computer system 100 receives a set of event streams 110 formed by grouping and/or processing information from respective sources into information to be processed by the computer system 100. In one embodiment, a message queue (e.g., as implemented by the "Apache Kafka platform") handles the creation of the event stream to be used by the system 100. In general, event streams can be formed by packaging the raw information into one or more packets that are transferred to a desired location (e.g., using an encrypted or unencrypted communications stream, such as a IPSec session or a TCP/IP connection, respectively). The computer system 100 receives the event streams 110 and performs a number of operations on the event streams (and optionally also on internally generated data or on data from data sources not shown).

In one exemplary embodiment, some of the information received in the event streams 110 is sufficient to enable the computer system 100 to track and invoice shipments. As shown in FIG. 1, the information received from the event streams 110 enable the system 100 to prepare an invoice (e.g., with a bill of lading, a truck identifier, a value of the shipment (identified as it "value"), a detention fee, a dock arrival time, and a POD (Proof of Delivery) identifier. The system further may process and/or generate EDI (Electronic Data Interchange) 204 forms (Motor Carrier Load Tender forms), as shown in FIG. 1 (with arbitrary text representing the load information for an exemplary EDI 204 form).

An exemplary computer system 100 may also be able to store on a blockchain network 120 and/or read from a blockchain network 120 information related to the event streams and/or the information generated within the computer system 100 (e.g., the invoices). In such a configuration, third-parties may be able to utilize the blockchain information to determine information about relevant shipments (e.g., tracking information, proof of delivery information and even delivery exception information).

Figure 2:
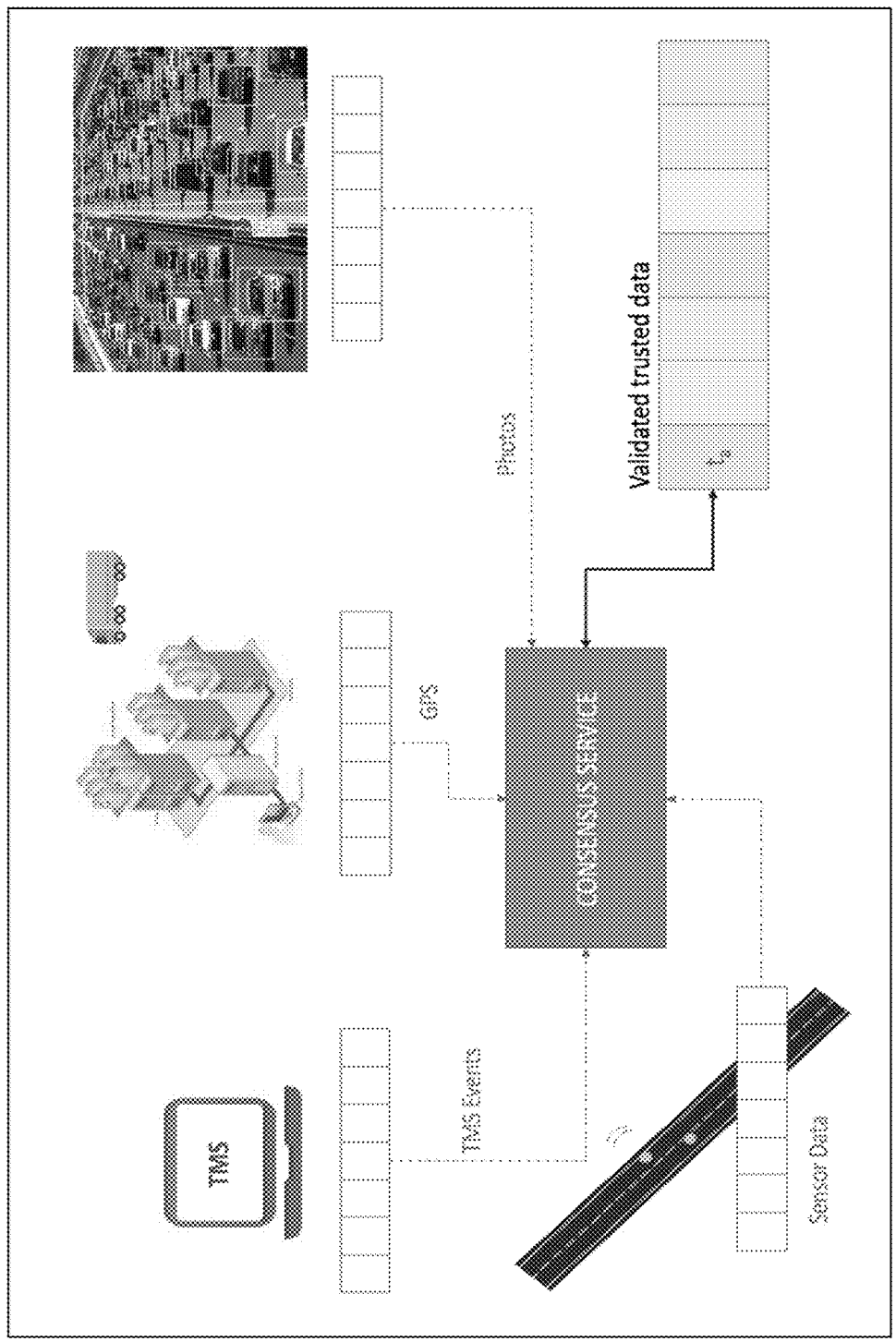
FIG. 2 is a data transfer diagram showing additional details on a number of exemplary data sources of FIG. 1.

As shown in greater detail in FIG. 2, a number of sources of data can be combined by a consensus service of the computer system 100 to determine a consensus as to where a vehicle making a delivery is currently located so the delivery can be tracked. By utilizing third-party verifiable information, shippers and receivers can have greater confidence when making shipment related decisions (e.g., just-in-time manufacturing decisions and payment decisions after a shipment has allegedly been delivered). As shown in FIG. 2, exemplary information that can be utilized to form a consensus includes, but is not limited to, driver-specified events (labeled TMS (Transportation Management System) Events) such as the changing of the status of a package to be delivered, self-reported data (such as GPS data relating to a vehicle's self-advertised location and/or video data from at least one on-board camera), and third-party sensor data (e.g., from road-side sensors and photo data (e.g., from toll cameras and/or security camera)). Such information can be combined and given a trust score (or consensus score) based on how much information corroborates the location of a vehicle (potentially storing the raw data and/or the consensus on a multi-party blockchain. (Access to the information on the blockchain that is delivery-related may be limited to the delivery contract participants, such as the shipper, the receiver, and the carrier including its subcontractors).

Figure 3:
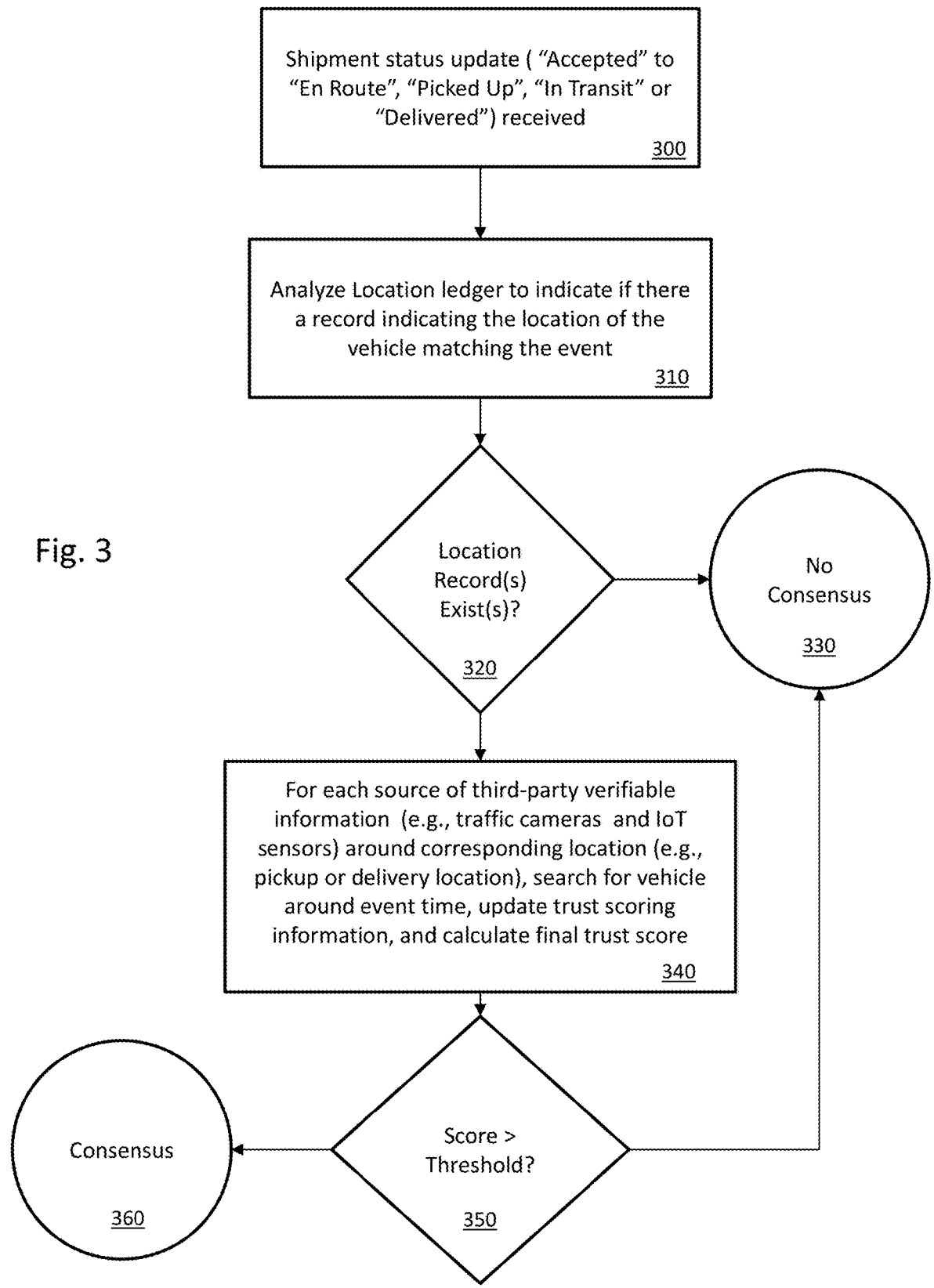
FIG. 3 is a flowchart showing an exemplary implementation of a trust scoring method that updates and tracks a trust score based on a vehicle-based trigger signal to determine if there is a consensus as to the location of a particular tracked vehicle.

As shown in FIG. 3, an exemplary process of generating a trust score and/or a consensus for vehicle location information can be represented by a flowchart. An exemplary trust score updating process begins in step 300 when the computer system 100 receives a "trigger signal" from a carrier (or from a vehicle directly) that a shipment/delivery status has changed. For example, the computer system 100 can receive a "shipment status update" that (1) a carrier has "accepted" a contract to deliver a package, (2) that the carrier is "en route" to pick up the package, (3) that the package has been "picked up", (4) that the package is "in transit" to the delivery location, and (5) that the package has been "delivered". That computer system 100 may, on a per-delivery basis store such statuses as strings (such as "Accepted," "En Route," "Picked Up," "In Transit," or "Delivered") or as other identifiers that internally represent those statuses (e.g., as integer which each represent a separate status). (As would be appreciated by those of skill in the art, other shipment status updates are also possible, such as delivery exception status updates (e.g., delivery location closed or equipment breakdown).) Each of those shipment status updates are "vehicle-based trigger signals" as they relate to a vehicle initiating a corroboration of a status change, even if the status change is routed from the vehicle to the carrier and then from the carrier to the computer system 100.

Moreover, the above shipment status updates are considered to be "client-facing shipment status updates" because they relate to status updates that affect the customer without specifying some of the internal details that may be available to the carrier and/or driver. For example, "en route" and "in transit" both encompass several finer grain details that are important to the carrier/driver. For example, a driver may have arrived at a location for pickup or delivery but is unable to immediately pick up or deliver as described above with respect to the Discussion of the Background. Each of those situations can result in "detention" of the delivery vehicle such that the carrier/driver is entitled to compensation for the resulting delay that often cascades into the carrier/driver missing a future delivery opportunity as a result. Accordingly, the system 100 can further be configured to respond to trigger signals that are "carrier-facing shipment status updates" and to capture and corroborate such updates. Such carrier-facing shipment status updates can include, but are not limited to, updates corresponding to each of the factors described above that indicate why immediate delivery/pick is unavailable (e.g., "at pickup transportation depot but loading area occupied," "at delivery transportation depot but loading area personnel unavailable," or "at pickup transportation depot but loading area asset unavailable"). A system may utilize even more fine grain codes to provide additional detail (e.g., "at shipyard transfer station for trailer load pickup but trailer load stacked beneath other trailer loads," "at railroad transfer station for trailer load pickup but trailer load still on train"). As described in further detail below, video information from other trucks and/or the transportation depot can corroborate such a status to support a carrier's/driver's claim of detention later.

In response to the computer system 100 receiving the trigger signal with an updated status, the computer system 100 determines in step 310 if there is location information available that corresponds to the change. For example, the computer system 100 may analyze either an event stream or event ledger to determine if the system 100 can find a location that corresponds to where the status change allegedly happened. Such information may be stored in a GPS event stream that is created by the carriers self-reporting their vehicles' locations or on a GPS blockchain ledger generated from carriers self-reporting their vehicles' locations. In one embodiment of the GPS systems described herein, the GPS system is a self-contained GPS unit that cryptographically signs or hashes at least a portion of the GPS data to avoid altering or misreporting the GPS information. For example, such a GPS unit would output not only a GPS position (and optionally the time at which the GPS position was taken) that acts as a message to be signed but also outputs a cryptographic signature of the message (GPS position and/or time) such that the GPS location cannot be faked. Third-party's can use known techniques (e.g., public key cryptography) to authenticate the message. Alternatively, the message could be hashed by the GPS unit along with an internally hidden random number and a time-varying value to produce a hash for the GPS message that could be verified by a verification site that knows the random number used by the GPS unit. In yet another embodiment, specialized GPS receivers using watermarked GPS satellite data can be used to prevent assertions of fraudulent GPS locations. (See Scott, L., "*Proving Location Using GPS Location Signatures: Why it is Needed and A Way to Do It,*" *Proceedings of the* 26*th International Technical Meeting of The Satellite Division of the Institute of Navigation* (*ION GNSS*+2013), Nashville, Tenn., September 2013, pp. 2880-2892.) In addition, where GPS information is not available, video information (e.g., a picture substantially matching a picture of a known location) can be used to determine a location corresponding to the status change.

Alternatively, for some status changes, a location for the status change can be inferred based on how the status changes. For example, when a status changes from "en route" to "picked up", the system can infer that the location of the action was at the origination location agreed upon in the contract. Similarly, when a status changes to delivered, the system can infer that the location of the action was at the delivery location agreed upon in the contract.

In step 320, the system determines if location information was found in step 310 (e.g., GPS-based, video-based or implicit location-based information). If step 320 determines that there is no location information available for the status change, then the computer system 100 passes control to step 330 and the computer system determines that there is no consensus as to the location of the corresponding event. That information can be made available to contract participants, either directly (e.g., via email) or via a shared resource (e.g., a web site or a blockchain).

If step 320 determines, however, that a location record does exist, the control is passed to step 340 in which the system 100 determines if there is additional, third-party verified information that corroborates the status change reported by the carrier. Not all locations will have third-party verified information that corroborates the status change reported by the carrier. For example, a pickup at a rural location from the front porch of a home with no one inside is unlikely to have any third-party verified information that corroborates the status change reported by the carrier.

To determine if there is third-party verified information in the vicinity of the location corresponding to the status change reported by the carrier, the system 100 may include a database of other sources of third-party verified information. The system 100 would query the database using the location information that is to be corroborated as a search parameter and optionally a maximum distance. For example, the system may search the database for information sources within a two block radius of the specified location (e.g., specified by GPS location or address) if the location is in a high density data source area, within a one mile radius in an urban setting, and within a 5 mile radius if the location is in a rural setting. Alternatively, the vehicle may provide the system 100 with "hints" about known third-party data sources that are known to the vehicle to be close to the specified location in order to supplement the information that the system has in its database (or to reduce query times by the system against the database). In one embodiment, for each information source found, the system can (iteratively or in parallel) query whether the information source has any information (or events) that corresponds to the status change being corroborated.

As an example of the verification performed in step 340, after a delivery has been "Accepted" by a carrier, the carrier dispatches a subcontractor to retrieve a package and notifies the system 100 that the status of the delivery should be updated to "en route." Preferably, the carrier includes (either directly or via an interface with the subcontractor) information sufficient to identify the vehicle associated with the "en route" pick-up. Such information may include license plate information, make and model of the vehicle, and any on-board tracking information that is available (e.g., the unique ID of a GPS-tracker associated with the vehicle, or the unique ID of the toll transponder of the vehicle, if available). The carrier also provides location information (e.g., from a GPS or via street address) of where the vehicle currently is (e.g., at another delivery or pick up location). The system 100 receives the location information corresponding to the alleged location and queries the database for relevant information sources within a corresponding radius. In one such embodiment, the system 100 waits a sufficiently long period of time after the alleged status change to allow the sensors to sense their respective information, process it and store it so that it is available for retrieval. How long a period that is may be sensor dependent (e.g., it may take longer for video information to become available than simpler (and less data intensive) Radio Frequency Identification (RFID) information). In some embodiments, the system 100 may have to query a source more than once if data from the source is not yet available for the vehicle being tracked. As a result, some final consensus scores may be delayed in being calculated, and the system may utilize one or more "timeouts" for when it dynamically removes sensors from the list of possible sensors that could corroborate a vehicle's location.

Figure 5:
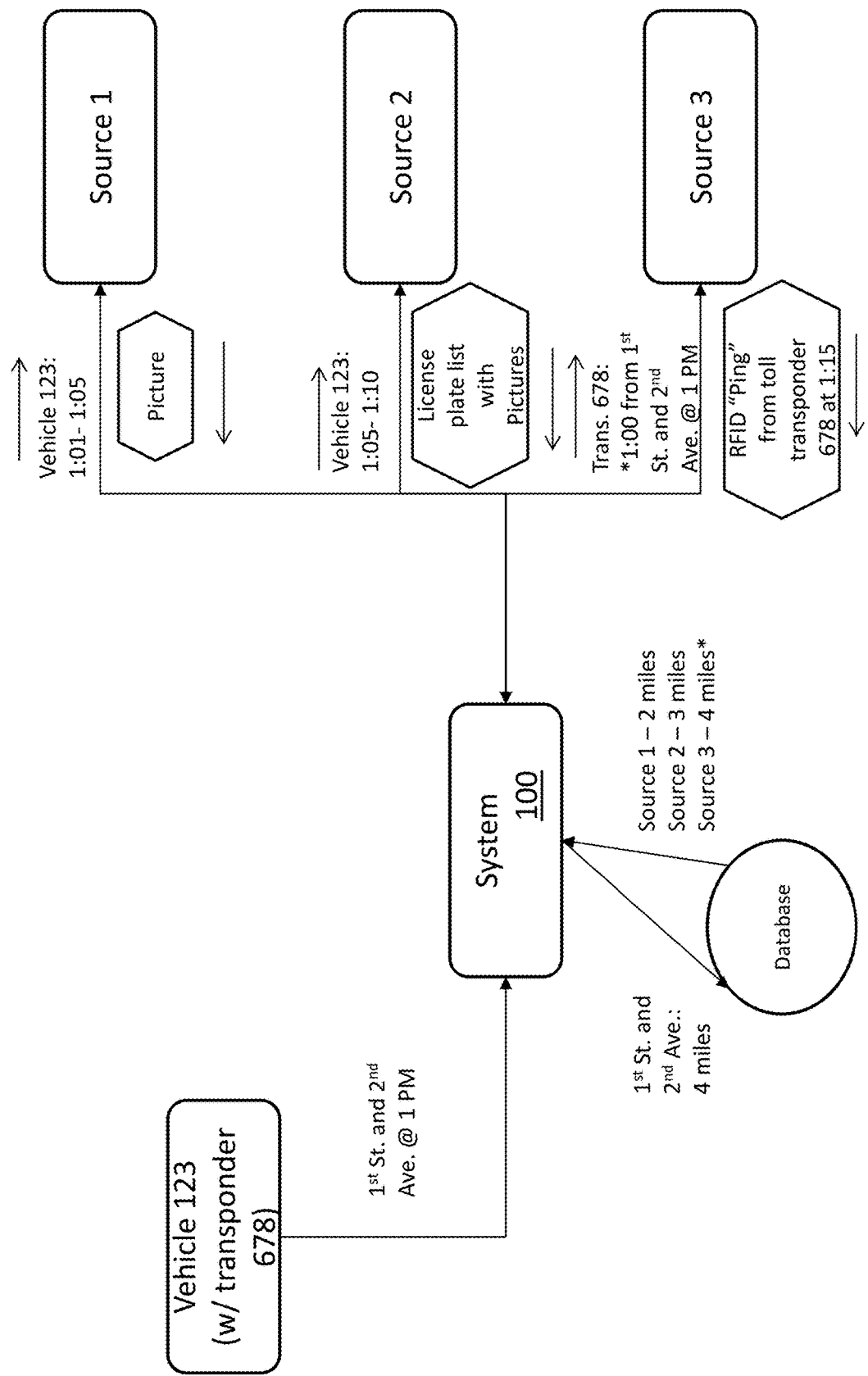
FIG. 5 is a dataflow diagram showing exemplary messages that can be sent from an exemplary system described herein to various networked sensors to read third-party verifiable data (although the same data could be read from corresponding multi-party blockchains)

In one example, as shown in FIG. 5, the location is in the downtown of a medium sized city, so the system queries a four-mile radius from the specified location (e.g., $1^{st}$ Street and $2^{nd}$ Avenue or GPS coordinates x & y) for information around the time of the status change (e.g., within some number of minutes of the time of the status change). The system may vary the length of time to use as the search window around the status change depending on the expected travel speeds of the vehicle and/or the distance from the alleged location of the vehicle and the location of the third-party information source. For example, shortly after a status change at 1 PM (e.g., at 1:10), source 1 may be queried for picture information (preferably with an embedded timestamp) for all passing vehicles between the times of 1:01 and 1:05 for a source that the database tells the system 100 is 2 miles from the status change (in the hopes of finding vehicle 123). Similarly, at 1:18, source 2 may be queried for a license plate list (preferably with an embedded timestamp) for vehicle 123 between the times of 1:05 and 1:10 for a source that the database tells the system 100 is 3 miles from the status change (having allowed extra time for sensor 2 to perform the image processing itself). Alternatively, the system may provide the third-party information source with a time and location corresponding to the trigger signal, and the third-party information source then is responsible for determining an appropriate time window itself (e.g., by source 3 looking for a corresponding transponder signal 678 and returning any matches in the timeframe that source 3 determined is relevant). In such a case, even though source 3 is farther away than sources 1 and 2, source 3 could be notified immediately after the status change (e.g., at 1:01) so that it has time to begin whatever scheduling it needs to do to be ready to capture and process the information. By providing advance notice to a source, the source may have time to marshal additional processing and/or storage resources that it might need to accommodate all of the requests that are being made of it. Similarly, if a small number of requests are being made of the system, the system may be able to dynamically shed processing and/or storage resources that are presently unneeded.

In the context of traffic cameras in the area that have shareable pictures from the relevant time, the system 100 can request (as with sensor 1 in FIG. 5) from each of the cameras cryptographically signed copies of the photos in the relevant (fixed, speed varying or distance varying) time period and can either process the license plates (i.e., perform optical character recognition (OCR) on the license plates) in the photos itself or transmit the photos to a third-party to perform the image processing. In an alternate embodiment, the system requests (as with sensor 2 of FIG. 5) that the traffic camera control system perform the image processing and provide a cryptographically signed list of licenses plates (which the system may then request the corroborating photo of if the system determines that the vehicle license plate is in one of the photos).

In addition to traffic cameras, another source of video information is one or more cameras mounted on or inside a vehicle (including one or more cameras mounted on or inside the vehicle being tracked). For example, a camera inside the driver compartment of Vehicle A that is pointing out towards the road may periodically (or at known GPS locations) take a picture of the area around Vehicle A such that geographically-identifiable landmarks can be recorded that corroborate Vehicle A's location. In one such configuration, pictures can be taken of (1) exit signs along a highway route, (2) signs indicating that the vehicle is entering a particular city or county, and/or (3) mile markers. In addition, pictures can be captured and stored of other vehicles (e.g., showing the license plate of Vehicle B) that is in front of Vehicle A (either going the same way or in the opposite direction). If Vehicle B's location also is being tracked by the system 100, then more than one tracked vehicle would be reporting similar locations simultaneously, and the system 100 would have increased confidence that the location information (e.g., GPS location information) being sent about the location of Vehicle A is reliable. (The same kind of information can be obtained from a rear facing camera as well.) Furthermore, the process can be used in reverse by having Vehicle A's location information be updated within the system 100 using video information (e.g., license plate information) from Vehicle C that is behind Vehicle A or passing Vehicle A in the opposite direction. The collection and processing of the video information on other vehicles can be provided as a service to third-parties that do not have in-vehicle systems or that are tracked by third-parties (i.e., are tracked by systems other than by system 100).

The video information captured from other vehicles' in-cabin cameras or exterior cameras also can be used to corroborate carrier-facing shipment status updates. A camera from a truck currently backed into in a loading area may be used to corroborate that another truck was waiting for the use of that loading area (either because the camera shows the waiting truck or because the background of the captured image shows that the truck at the loading area must have been at the loading area). (In addition, the GPS information of the truck at the loading area can further be used to corroborate the location of the truck at the loading area (and consequently that the loading area was occupied).)

Other video capture devices also are possible, such as security cameras (e.g., at transportation depot entrances/exits, and loading area) of transportation depots at which deliveries are to be picked up and/or dropped off, local homes or stores that are participating in the corroboration process, video cameras at distribution centers, and video cameras at toll booths. Additional corroborating "video" information may include information (e.g., the Media Access Control (MAC) address) about the device that captured the video which can be cross-checked against public information about that device.) Having received an indication of how many photos, if any, corroborate the location of the vehicle, the system 100 updates the information related to the delivery.

Similarly, when the system queries the database for information sources within a four-mile radius from $1^{st}$ Street and $2^{nd}$ Avenue, the system also may find that there are a number of toll booth receivers in the area that can be queried to see if the toll transponder of the vehicle also indicates that the vehicle was near the designated area (as shown with respect to source 3 in FIG. 5). Other RF-based systems similarly can be used, such as a WiFi transceiver in a known location having momentarily connected to a WiFi hotspot on the vehicle (or the other way around). Internet of Things (IoT) sensors on the streets and/or highways can similarly be used to provide location information. Similarly, a number of utility companies (e.g., gas, water and electric companies) have special-purpose networks for tracking the usage of the corresponding utilities. In some embodiments, the system may receive (1) data collected from those utilities using the utility companies' sensors or (2) data collected from other sources (e.g., information collected on-board the vehicle) but forwarded to the system using the communications networks used by the utilities (i.e., piggybacking transmission of the data on the utilities' networks).

In another example, a driver changes a status of a shipment from "en route" to "picked up." As discussed above, the system does not need GPS location information from the truck or a GPS sensor to know the location of the driver at that point in time—the driver is at the location specified for the shipment pick up. In addition to the consensus information discussed above, other verifiable information relating to the pick-up (or drop-off) location can be utilized (e.g., still shots or live video from video cameras in the pick-up location, the signature of a receptionist or loading area employee, or information from an RFID tag around the driver's neck that is read by an RFID reader at the pick up location or a Bluetooth compatible device that connects to a Bluetooth device carried by the driver (e.g., in its barcode reader or telephone) while at the pick up location. As would be appreciated by those of skill in the art, the verifiable information discussed above can be read in response to the vehicle-based trigger signal or could be used as sensor-based triggers. Additionally, other location-specific information gathered by the driver at a location could be used to supplement the vehicle-based trigger, such as an RFID signal at the location that is read by an RFID reader in the driver's barcode scanner, a Bluetooth signal at the location that is read by a Bluetooth reader in the driver's barcode scanner or phone, a time varying barcode that is read by the driver's barcode scanner, and a short-range geotag (e.g., a time-varying cryptographic-based token) transmitted at the origin that is automatically added by a SnapChat-like filter to a picture of the package and/or the driver.

In each of the above configurations, the information that is utilized to help corroborate a vehicle location can either be received in a raw form, as part of an event stream from an authenticated information source, or from a distributed multi-party blockchain ledger. The corroborating information may be data that is, for example, streamed continuously (live), available upon request, recorded in a blockchain ledger or that is requested by the system 100 to be sensed or recorded by available equipment. In each embodiment, the system 100 may write the data to one or more multi-party distributed blockchain ledgers to provide a permanent, cryptographically signed and verifiable record of the data that was used as part of a consensus calculation.

Figure 4:
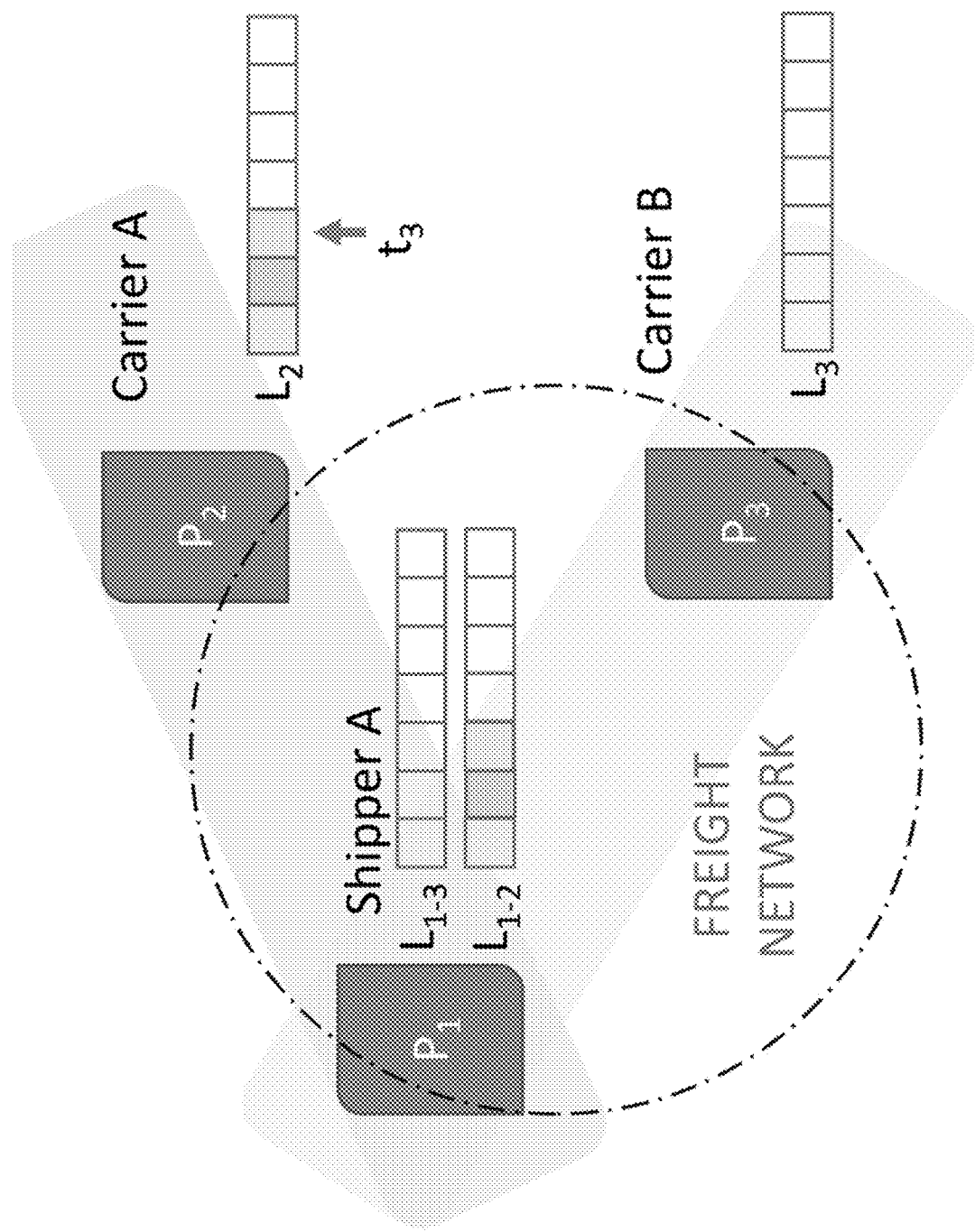
FIG. 4 is data sharing diagram showing a shipper (Shipper A), two carriers (Carrier A and Carrier B), and the information about the deliveries in the respective shipping "lanes" between them.

However, in many instances, not all data should be shared publicly. As shown in FIG. 4, a shipper (labeled "Shipper A") may have shipping contracts with multiple carriers (e.g., "Carrier A" and "Carrier B"), and the shipper and carriers may share information about the deliveries in the respective shipping "lanes" between them (but only with the corresponding party). FIG. 4 conceptually shows the information about three shipments in the lane ($L_{1-2}$) between Shipper A and Carrier A at a fixed point in time ($t_3$) that is shared between Shipper A and Carrier A but isolated from Carrier B. Such a configuration would prevent Carrier B from knowing the location of vehicles of Carrier A (e.g., that may be transporting valuable packages or controlled substances that are prone to theft).

A portion of the above-discussion focused on the corroboration being triggered by the change in a delivery status (e.g., from "en route" to "picked up"). However, as would be appreciated by those of skill in the art, the process could also happen from time-to-time (e.g., a trigger signal is sent periodically to the system with the vehicle's current location), when the vehicle stops, or at known locations during the vehicle's travels. For example, after a vehicle has picked up a package for a first delivery, the vehicle may stop at a different location to make a pick-up for a second delivery. During the pick-up for second delivery, although the system is not making a status update corresponding to the first delivery, the system could nonetheless use the opportunity to update location information for the first delivery. (The status change in the second delivery would act as a trigger signal to the system 100 for both the first and second deliveries.)

Similarly, a vehicle could send a trigger signal to the system by updating the vehicle's status to "near location X" when it nears a location with known third-party verifiable data sources so that the system can perform automatic corroboration, increasing the trust score of a shipment. The driver may be made aware of such locations based on the visual clues on the screen of a navigation program thereby encouraging the driver to take a more verifiable route.

In an automated navigation system containing information on the location of known third-party verifiable data sources, the driver may be directed away from a shortest distance route to a route that is known to contain third-party information tracking devices that can corroborate the location of the vehicle. Since traffic cameras most often are installed in urban locations, this automated navigation is preferably utilized when the vehicle passes through a city or when the final destination is in an urban location. By breaking the route into multiple segments in such a way that each segment covers an urban area, the vehicle could be rerouted to obtain more coverage when the out of original route distance is less than a configurable percentage of the overall distance for that particular segment.

In one configuration, the system may provide configurable weightings to the vehicle's route management software such that the presence of sensors is taken into consideration just like other factors (e.g., differing speed limits on similar length routes or differing probabilities of congestion on similar length routes). In such a configuration, the system may treat a route with a corroborating sensor as "better" (e.g., similar to a route with higher speed limit or less likely to be congested) when routing the vehicle. As a result, the vehicle is more likely to pass a corroborating sensor. One such configuration may also factor in the amount of time since the last corroborating sensor and whether or not the vehicle is equipped with on-board video that can act as corroboration. For example, a truck without corroborating video that has not been past a corroborating sensor in a threshold period of time (e.g., 30-45 minutes) may be routed on a route that is 1 minute slower than the optimal route but would not be routed on a route that was 10 minutes slower for the same period of time since corroborating evidence was obtained. However, a vehicle with on-board video need not be routed over the 1 minute slower route as it already has corroborating evidence, even if it is not from a third-party.

Figure 6:
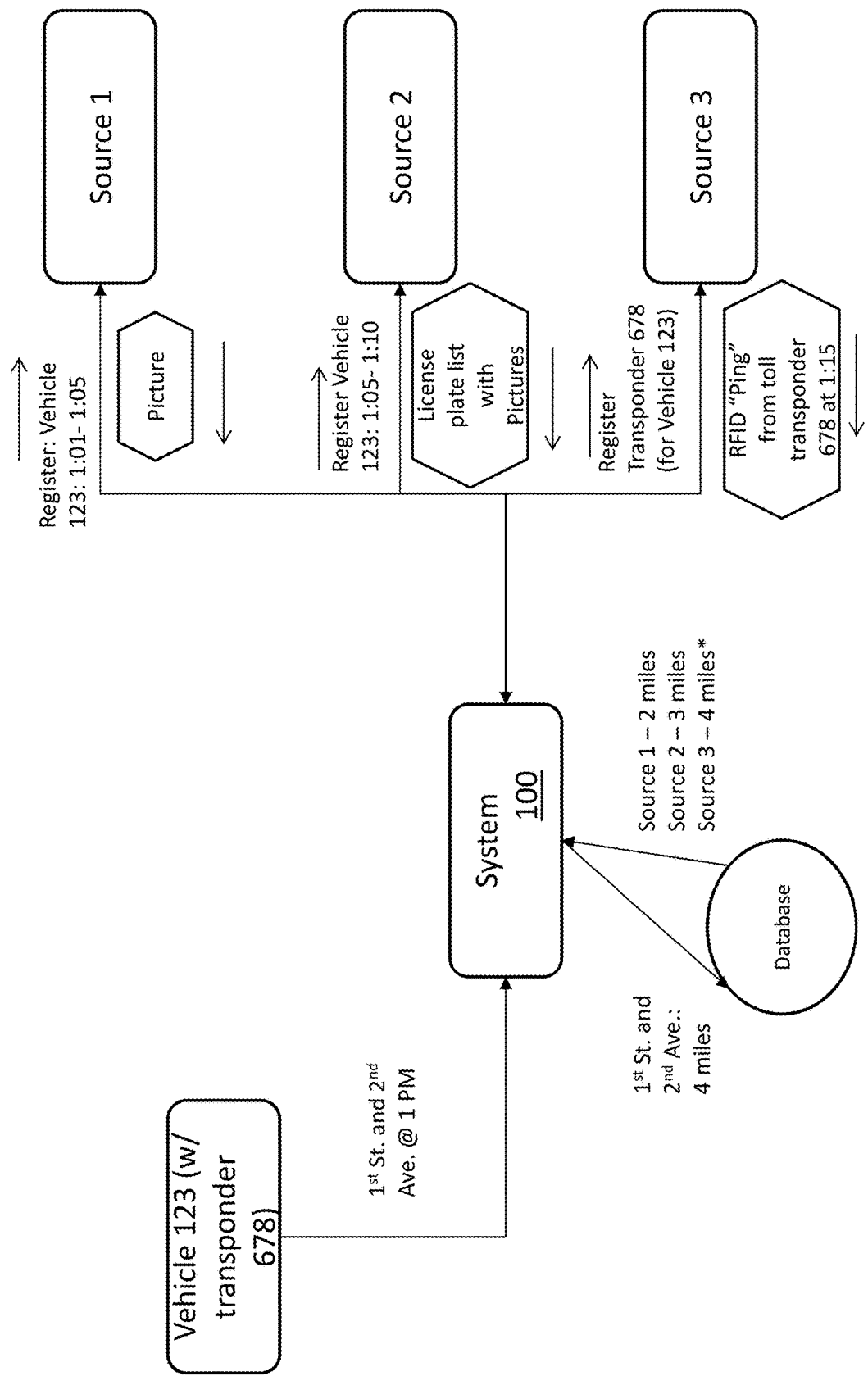
FIG. 6 is a dataflow diagram showing exemplary messages that can be sent from an exemplary system described herein to various networked sensors to request that the sources attempt to create third-party verifiable data that can be returned for processing by the system if/when available (although the same data could be written to corresponding multi-party blockchains for later retrieval by the system)
Figure 7:
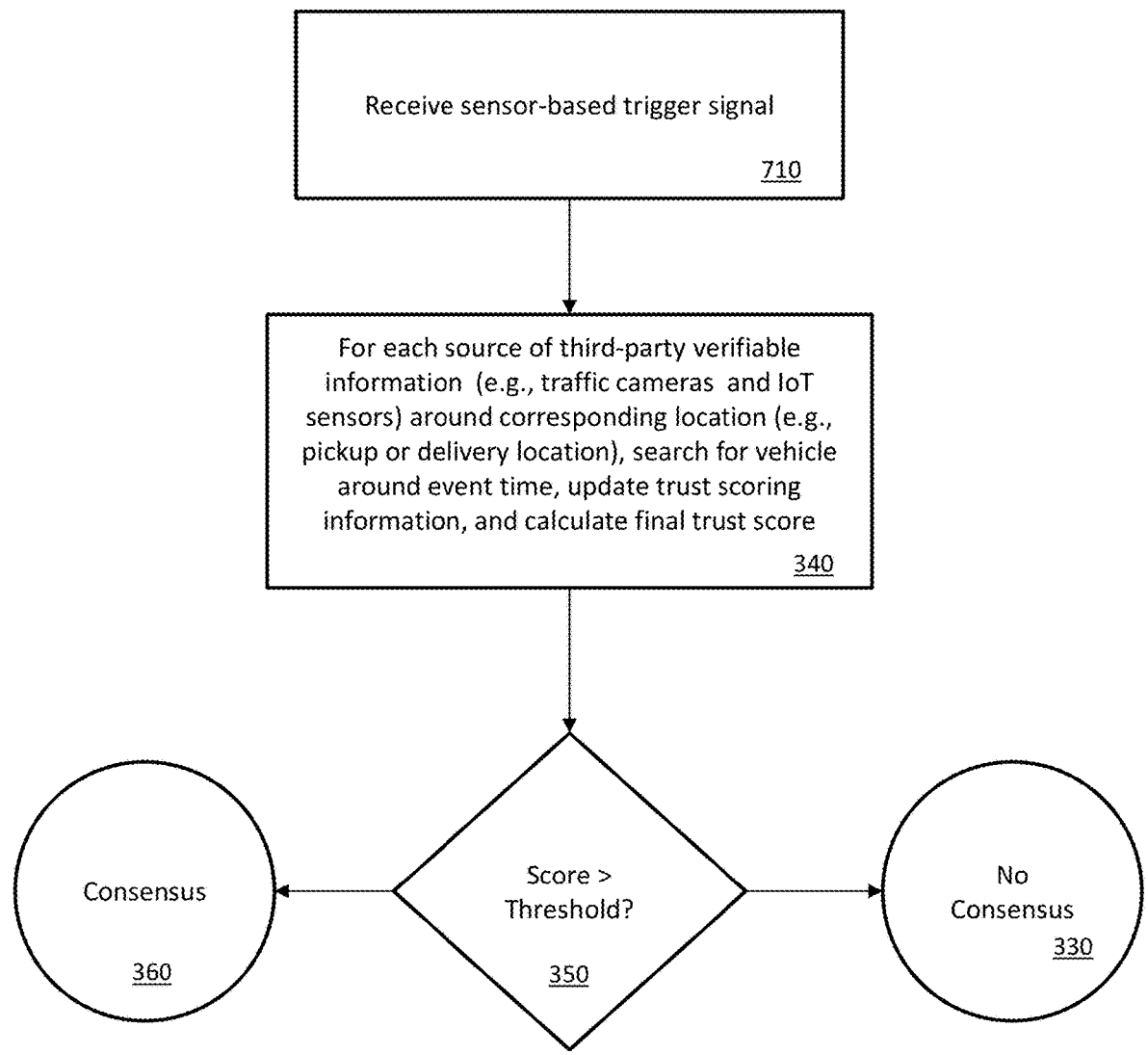
FIG. 7 is a flowchart showing an exemplary implementation of a trust scoring method that updates and tracks a trust score based on a sensor-based trigger signal to determine if there is a consensus as to the location of a particular tracked vehicle.

A portion of the above discussion has focused on requesting information from information systems that are expecting to be continuously gathering and storing information (e.g., toll both cameras), but the system also can be used to trigger data captures for devices that may not always be recording (or storing the recordings). For example, camera captures could be triggered based on the detection of a WiFi MAC address of a device on a delivery vehicle coming into range at a location and/or the RFID or barcode on a package passing a sensor. Alternatively, the camera captures could be triggered based on the vehicle or the system transmitting to a known sensor that the navigation system predicts that the vehicle will pass by the sensor at a particular time. As shown in FIG. 6, the trigger signal that is used to update the corroborating information need not be generated by the vehicle or the system 100. Instead, by the system 100 registering what information it is looking for with each of the corresponding sensors, the sensors themselves can utilize "sensor-based trigger signals" sent to the system 100 so that the corroborated location of the vehicle can be updated as shown in FIG. 7. The sensor-based trigger signals can include the data itself or can simply include an indication that the data is available and can be queried or read by the system 100 (e.g., from a multi-party blockchain having the sensor's data stored thereon). When triggering or requesting a data capture, the system can request the data capture for a particular time or time period (e.g., in three minutes).

As described herein, the system 100 collects, stores and publishes information about the location of vehicles involved in a shipment and/or delivery on at least one distributed blockchain ledger. Each of the above types of corroborating evidence can be used as part of the consensus score. Consensus can be achieved using relative consensus, absolute consensus, and hybrid consensus. In relative consensus, the system determines that there is a consensus among data sources if a threshold percentage of the sensors in a particular area indicate that the vehicle was where it claimed to be. For example, a vehicle is passing a known location that has video cameras, toll booths, and a WiFi or Bluetooth hotspot. Because of the speed of passing vehicle or interference or congestion, the WiFi or Bluetooth hotspot does not corroborate the location of the vehicle's self-reported GPS location, but both the video camera and the toll booth corroborate the location. The vehicle would have a 66% confirmation rate (two confirmation methods out of three), and if the threshold was 60%, then the system would determine that the vehicle's self-reported GPS location is confirmed. If the vehicle likewise has an on-board camera that has recently obtained corroborating video, then the vehicle would have a 75% confirmation rate (three confirmation methods out of four), and the system would again have a consensus.

Alternatively, the system can use an absolute consensus scoring system. For example, if the vehicle's self-reported GPS location is corroborated by at least 2 other sensors (including cameras), even if there were 10 other sensors, that may be sufficient to be above an absolute threshold. Such a configuration may be appropriate where the sensors in an area cannot keep up with the reporting load being requested. A hybrid consensus can also be utilized (e.g., an absolute threshold of three unless there are at most three sensors in an area and then a relative threshold of 50%). The system also can be configured to use various thresholds depending on location (e.g., requiring higher thresholds in urban areas and smaller thresholds in rural areas). The system further can be configured to filter out extraneous data or automatically void any potential consensus in the presence of contradictory data (e.g., (a) a device is reporting a location that would cause it to be at a location that appears unreasonable given (1) the time since the last corroborated location was reported and (2) the speed limits in between those locations, and (b) a device is reporting location more than 100 miles from where a sensor is reporting the vehicle is).

In general, as shown in step 340 of FIG. 3, the verifiable information is combined to produce a trust score that, in step 350, is compared to a threshold. If the score exceeds the threshold (for a positive threshold) (or is less than the threshold for a negative threshold), the system indicates in step 360 that there is a consensus as to the vehicle's location, and the consensus (and optionally the underlying data used to achieve the consensus) are written to at least one distributed blockchain ledger that corresponds to communications between contract participants only (or onto at least one distributed blockchain ledger that is publicly accessible but for which the data is encrypted in a manner in which only contract participants can unencrypt the data). If a comparison of the score and the threshold indicates that there is not a consensus, then the system passes control to step 330 to record and/or indicate that there is no consensus.

The above scoring is performed using what can be referred to as "instantaneous scoring"—that is, scoring based on sensor readings corresponding to a single, particular trigger signal. The instantaneous scoring does not take into consideration the use of previous trust scores and/or consensus information. Alternatively, the system 100 can utilize a "delayed score" which performs scoring based on sensor readings in combination with a positive or negative previous consensus determination and/or trust score. For example, if the system had 15 and 30 minutes previously determined that there was a consensus as to the tracked vehicle's location, but a current trigger signal was inconclusive (e.g., 50% of the sensors corroborated the location but the threshold was 60%), then a delayed score could be used which could include a decaying factor (e.g., $10\%^{(t_i/15)}$) for the last three times ($t_i$) that a consensus value indicated a corroborated location. So, if an instantaneous score was 50% and there were corroborated locations 15 and 30 minutes ago (but not 45 minutes ago), the delayed score would be, in an exemplary embodiment:

$$50\%+(10\%)^{(15/15)}+(10\%)^{(30/15)}=50\%+10\%+1\%=61\%.$$

Such a delayed score would cause there to be a corroborated location when the threshold is 60%.

In one embodiment of the present invention, the system 100 utilizes at least one computer processor coupled to at least one computer memory (e.g., RAM, SRAM, or FRAM), wherein the at least one computer processor executes a set of computer instructions stored in the at least one computer memory to perform the functions described herein. A number of different computer languages and styles of computer languages can be used to implement the functions described herein, such as interpretive and compiled languages. Indeed, a number of languages (e.g., Python) that can be used to write the code to implement the functions described herein can be both interpreted and compiled. Similarly, the functions described herein can be implemented as part of a state machine in circuitry (e.g., FPGAs, ASICs, SOCs, and processor/memory). In each of those implementations, the circuitry preferably includes at least one communications interface for interfacing with the sources of data described herein and for reading from and/or writing to the distributed, multi-party ledgers described herein. Various input and output devices such as displays, printers, microphones and keyboards may be used with the system 100.

While certain configurations or structures have been illustrated for the purposes of presenting the basic structures of the present invention, one of ordinary skill in the art will appreciate that other variations are possible which would still fall within the scope of the appended claims.

The invention claimed is:

1. A computer-implemented method to corroborate package delivery statuses reported by carriers, comprising:
   by one or more computing devices:
      receiving, from a carrier computing device associated with a vehicle, a carrier-side status signal indicating a delivery status of a package;
      determining a location of the vehicle corresponding to the delivery status wherein determining the location comprises:
         accessing an event stream that includes location data that corresponds to the location of the vehicle corresponding to the delivery status, the location data including a cryptographic hash including a hidden random number and a time varying value generated by a global positioning system (GPS) unit of the carrier computing device; and
         verifying the cryptographically hashed location data using the hidden random number;
      transmitting, to third party computing devices located within a radius of the determined location, a request for third-party corroborating information;
      receiving, from one or more of the third party computing devices, one or more third-party information corroborating a presence of the vehicle at the location corresponding to the delivery status;
      within a specified time period of an occurrence of the carrier-side status signal, corroborating the carrier-side status signal indicating the delivery status by:
         determining a consensus score for the carrier-side status signal indicating the delivery status of the package based on a number of received third party information that corroborates the presence of the vehicle at the location corresponding to the delivery status; and
         in response to determining that the consensus score is greater than a threshold consensus score, storing, on a blockchain, information relating to a corroborated delivery status to generate an updated blockchain, wherein the updated blockchain is accessible to a carrier computing system associated with the carrier computing device, wherein the information relating to the corroborated delivery status comprises the received one or more third-party information.

2. The computer-implemented method of claim 1, wherein the delivery status comprises one of Accepted, En Route, Picked Up, In Transit, and Delivered.

3. The computer-implemented method of claim 1, wherein the carrier-side signal comprises location data indicating the location of the vehicle corresponding to the delivery status, wherein determining the location comprises determining the location from the location data.

4. The computer-implemented method of claim 3,
wherein the one or more third-party information comprises one or more of images and video from a camera.

5. The computer-implemented method of claim 3,
wherein the one or more third-party information comprises information from a roadside radio frequency receiver indicating when the vehicle was at a known location.

6. The computer-implemented method of claim 5, wherein the information indicating when the vehicle was at a known location comprises at least one of toll transponder information, WiFi device connection information, and Bluetooth device connection information.

7. The computer-implemented method of claim 1, wherein the carrier-side signal comprises a sensor-based trigger signal.

8. The computer-implemented method of claim 1, wherein the one or more third-party information comprises data from a second blockchain.

9. The computer-implemented method of claim 1, wherein the location corresponding to the delivery status comprises a GPS location of the vehicle.

10. The computer-implemented method of claim 1, wherein the location corresponding to the carrier-side signal comprises a delivery location determined by a contract for delivery of the package and an updated status for the contract for the delivery of the package.

11. The computer-implemented method of claim 1, further comprising, by the one or more computing devices, determining, for one or more of the one or more third-party information, that the respective third-party information corroborates that the vehicle was present at the location based on the third-party information being retrieved from at least one of a raw data source, an event stream and a multi-party blockchain.

12. A system to corroborate package delivery statuses reported by carriers, comprising:
 a non-transitory computer memory;
 a computer processor coupled to the computer memory, wherein the computer processor is configured to execute computer instructions from the computer memory to cause the system to:
  receive, from a carrier computing device associated with a vehicle, a carrier-side status signal indicating a delivery status of a package;
  determining a location of the vehicle corresponding to the delivery status, wherein determining the location comprises:
   accessing an event stream that includes location data that corresponds to the location of the vehicle corresponding to the delivery status, the location data including a cryptographic hash including a hidden random number and a time varying value generated by a global positioning system (GPS) unit of the carrier computing device; and
   verifying the cryptographically hashed location data using the hidden random number;
  transmitting, to third party computing devices located within a radius of the determined location, a request for third-party corroborating information;
  receiving, from one or more of the third-party computing devices, one or more third-party information corroborating a presence of the vehicle at the location corresponding to the delivery status;
  determining a consensus score for the presence of the vehicle at the location based on a number of received third-party information that corroborates the presence of the vehicle at the location;
  in response to determining that the consensus score is greater than a threshold consensus score, storing, in a blockchain, information relating to a corroborated delivery status to generate an updated blockchain, wherein the updated blockchain is accessible to a carrier computing system associated with the carrier computing device, wherein the information relating to the corroborated delivery status comprises the received one or more third-party information.

13. The system of claim 12, wherein the carrier-side signal comprises location data indicating the location of the vehicle corresponding to the delivery status, wherein determining the location comprises determining the location from the location data.

14. The system of claim 12, wherein the location corresponding to the delivery status comprises a GPS location of the vehicle.

15. The system of claim 12, wherein the location corresponding to the carrier-side signal comprises a delivery location determined by a contract for delivery of the package and an updated status for the contract for the delivery of the package.

16. A non-transitory computer-readable storage medium comprising computer-readable instructions that, when executed by a processor, cause the processor to perform operations to corroborate delivery statuses reported by carriers, the operations comprising:
 receiving, from a carrier computing device associated with a vehicle, a carrier-side status signal indicating a delivery status of a package;
 determining a location of the vehicle corresponding to the delivery status, wherein determining the location comprises:
  accessing an event stream that includes location data that corresponds to the location of the vehicle corresponding to the delivery status, the location data including a cryptographic hash including a hidden random number and a time varying value generated by a global positioning system (GPS) unit of the carrier computing device; and
  verifying the cryptographically hashed location data using the hidden random number;
 transmitting, to third party computing devices located within a radius of the determined location, a request for third-party corroborating information;
 receiving, from one or more of the third party computing devices, one or more third-party information corroborating a presence of the vehicle at the location corresponding to the delivery status within a specified time period of an occurrence of the carrier-side signal;
 determining a consensus score for the presence of the vehicle at the location based on a number of received third party information that corroborates the presence of the vehicle at the location corresponding to the delivery status;

in response to determining that the consensus score is greater than a threshold consensus store, storing, on a blockchain, information relating to a corroborated delivery status to generate an updated blockchain, wherein the updated blockchain is accessible to a carrier computing system associated with the carrier computing device, wherein the information relating to the corroborated delivery status comprises the received one or more third-party information.

17. The non-transitory computer-readable medium of claim 16, the carrier-side signal comprises location data indicating the location of the vehicle corresponding to the delivery status, wherein determining the location comprises determining the location from the location data.

18. The non-transitory computer-readable medium of claim 16, wherein the location corresponding to the delivery status comprises a GPS location of the vehicle.

19. The non-transitory computer-readable medium of claim 16, wherein the location corresponding to the carrier-side signal comprises a delivery location determined by a contract for delivery of the package and an updated status for the contract for the delivery of the package.

20. The non-transitory computer-readable medium of claim 16, wherein the delivery status comprises one of Accepted, En Route, Picked Up, In Transit, and Delivered.

\* \* \* \* \*